United States Patent [19]

Marciandi et al.

[11] 4,333,869
[45] Jun. 8, 1982

[54] SELF-EXTINGUISHING POLYMERIC COMPOSITIONS

[75] Inventors: Franco Marciandi, Rho; Pasquale Relvini, Bollaten, both of Italy

[73] Assignee: Montedison S.p.A., Milan, Italy

[21] Appl. No.: 187,048

[22] Filed: Sep. 15, 1980

[30] Foreign Application Priority Data

Sep. 18, 1979 [IT] Italy ............... 25790 A/79

[51] Int. Cl.³ .................. C08K 3/32; C08K 5/34
[52] U.S. Cl. ...................... 524/100; 525/113; 528/367; 524/140; 524/416
[58] Field of Search .............. 525/113; 528/367; 260/45.8 NT, 45.9 NP

[56] References Cited

U.S. PATENT DOCUMENTS

| | | | |
|---|---|---|---|
| 3,337,509 | 8/1967 | Budnowski | 528/405 |
| 3,530,095 | 9/1970 | Porret | 528/36 7 |
| 3,810,862 | 5/1974 | Mathis et al. | 260/42.45 |
| 3,920,685 | 11/1975 | Porret et al. | 528/367 |
| 3,936,416 | 2/1976 | Brady | 260/42.18 |
| 3,959,219 | 5/1976 | Aoyama et al. | 260/45.75 B |
| 4,001,177 | 1/1977 | Tsutsumi et al. | 260/45.8 NT |
| 4,067,847 | 1/1978 | Yui et al. | 260/45.7 R |
| 4,115,351 | 9/1978 | Joh | 260/45.9 NP |
| 4,198,493 | 4/1980 | Marciandi | 260/45.9 NP |

Primary Examiner—John Kight, III
Assistant Examiner—R. A. White
Attorney, Agent, or Firm—Morgan, Finnegan, Pine, Foley & Lee

[57] ABSTRACT

This invention relates to self-extinguishing polymeric compositions, comprising a thermoplastic polymer, preferably a polyolefin, and an anti-flame additive consisting of:

(1) 10–25% by weight, on the total composition, of an ammonium or amine phosphate; and
(2) 10–25% by weight, on the total composition, of a product obtained by reacting in bulk, at a temperature comprised between 80° C. and 230° C.,
   (a) at least one organic compound selected from the group consisting of
      (i) linear or cyclic nitrogen containing compounds having at least one >C=O or >C=S group and at least one —NH—group being part of the linear chain or of the ring, and
      (ii) amino-triazine compounds; with
   (b) an epoxyalkyl ester of isocyanuric acid of the formula:

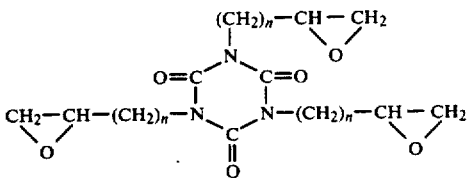

wherein n is an integer from 1 to 3;
the reaction being carried out according to a molar ratio (a):(b) comprised between 3:1 and 0.1:1.

The invention also includes paints and coatings containing the above-mentioned self-extinguishing polymeric compositions.

The invention also includes articles having self-extinguishing properties by the application thereto of the above-mentioned polymeric compositions.

15 Claims, No Drawings

SELF-EXTINGUISHING POLYMERIC COMPOSITIONS

BACKGROUND OF THE INVENTION

In the prior art there are known various methods for improving the anti-flame properties of thermoplastic polymers. One of the most recent of such methods consists in admixing with the polymer a combination of an ammonium phosphate or other organic phosphorus containing compound and of one or more organic substances capable of yielding, by thermal decomposition, uninflammable gaseous products (water, carbon dioxide, ammonia, nitrogen) and carbonaceous residues. The aforementioned organic substances consist of nitrogen containing compounds (e.g. melamine, cyanuric acid, dicyandiammide, urea, ethylenurea and others) or of mixtures of a nitrogen containing compound and a polyalcohol.

In Italian patent application No. 27.520 A/77 there have been described and claimed polymeric self-extinguishing compositions consisting of a thermoplastic polymer and an anti-flame additive consisting of:

(A) an ammonium or amine phosphate;
(B) one or more organic compounds capable of yielding, by thermal decomposition, uninflammable gaseous products and carbonaceous residues; and
(C) an ester of isocyanuric acid of general formula:

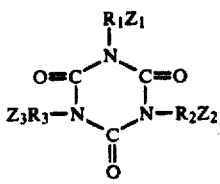

wherein $R_1$, $R_2$, $R_3$ either like or different from each other, are linear or branched alkylene groups having from 1 to 6 enchained carbon atoms, while $Z_1$, $Z_2$, $Z_3$ are —OH groups or

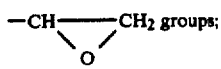

the ratio by weight (B)/(C) ranging from 10:1 to 1:10, and components (A) and (B)+(C) each being used in a quantity of 5%–30% by weight on the total of the composition.

In such compositions the substitution of a part of the second additive with the isocyanuric ester has the effect of boosting the anti-flame effectiveness of the (A)+(B) combinations.

In the above cited patent application it was specified that components (B) and/or (C) are used preferably in a form insoluble in water, that is, in the cross-linked state, the cross-linking being carried out according to known techniques. For example, when component (B) is a nitrogen containing compound, such as melamine, urea or dicyandiamide, it can be used in the form of a condensation product with formaldehyde; when component (C) is a hydroxyalkylisocyanurate, it can be made to react with an organic polyisocyanate or with formaldehyde, and when it is an epoxyalkylisocyanurate, one can revert to a cross-linking with one of the known curing agents for epoxy resins, such as a polyamine.

In the above-cited patent application it was, moreover, asserted that according to an even more preferred form of embodiment components (B) and (C) are cross-linked together under formation of a single macromolecular structure: thus for instance, instead of using a combination of a reaction product tris(2-hydroxyethyl)isocyanurate/formaldehyde and of a reaction product melamine/formaldehyde, there may be used a single resin tris(2-hydroxyethyl)isocyanurate/melamine/formaldehyde resin which is prepared by reacting under heat an aqueous solution of formaldehyde, acidified with sulphuric acid, first wtih tris (2-hydroxyethyl) isocyanurate and subsequently with melamine, said reaction being carried out at two distinct temperatures, for a total time of about 7 hours.

OBJECTS OF THE INVENTION

An object of this invention is to provide a more simplified manner of achieving improved resistance to combustion of thermoplastic compositions than that provided by the heretofore available prior art techniques discussed above.

A further object of this invention is to provide self-extinguishing polymeric compositions containing anti-flame additive whose use offers a big advantage from an economical point of view.

GENERAL DESCRIPTION OF THE INVENTION

It has been found that the objects of this invention may be realized by providing an anti-flame additive in which component (B) of the anti-flame additive is a linear or cyclic, nitrogen containing organic compound, having at least one >C=O or >C=S group and at least one —NH— group as a part of the linear chain or of the ring, or an amino-triazine compound, and component (C) of the same additive is an epoxyalkyl ester of isocyanuric acid, it is possible to use said components (B) and (C) in the form of a single structure prepared without having recourse to the use of aldehydes or other cross-linking agents and without working in a solution or in a suspension: in fact, in such a case it is possible to use a product obtained by reacting in bulk, and possibly in the presence of molten polymer, the components (B) and (C) according to a molar ratio comprised between 3:1 and 0.1:1, preferably between 2:1 and 0.5:1 and at a temperature comprised between 80° C. and 230° C., possibly in the presence of a Lewis acid or a Lewis base as a catalyst, for instance SnCl$_4$, ZnCl$_2$, aliphatic amine, imidazol.

This way of operating turns out to be considerably simplified with respect to that described in the Italian patent application No. 27.520 A/77, and the use of the corresponding reaction product offers a big advantage from an economical point of view.

The self-extinguishing polymeric compositions of the present invention comprise, thus, a thermoplastic polymer and an anti-flame additive consisting of:

(1) 10–25% by weight, on the total of the composition, of an ammonium or amine phosphate; and
(2) 10–25% by weight, on the total of the composition, of a product obtained by reacting in bulk, at a temperature comprised between 80° C. and 230° C.,
  (a) at least one organic compound selected from the group consisting of
    (i) linear or cyclic nitrogen containing compounds having at least one >C=O or >C=S group and at least one —NH— group as a part of the linear chain or of the ring, and (ii) amino-triazine compounds, with (b) an epoxyalkylester of isocyanuric acid of the formula:

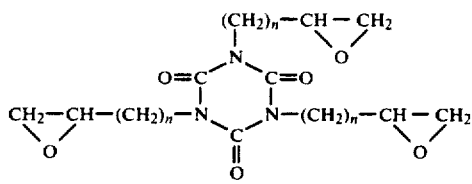

wherein n is an integer from 1 to 3; the reaction being effected according to a molar ratio (a):(b) comprised between 3:1 and 0.1:1.

Of the usable phosphates the preferred ones are the ammonium polyphosphates which fall under the general formula $(NH_4)_{n+2}P_nO_{3n+1}$ wherein n is an integer sufficiently high to ensure a low solubility in water of the polyphosphate itself.

The composition of the polyphosphates of the above-indicated formula, in which n is a number greater than 20, is practically the composition that corresponds to the formula of the metaphosphates $(NH_2PO_3)_n$.

Examples of such polyphosphates are the "Exolit 263" (produced and sold by Benckiser Knapsack GmbH), having the composition $(NH_4PO_3)_n$ wherein n is greater than 50, and the "Phos-Chek P/30" (produced and sold by Monsanto Chemical Company) having an analogous composition.

Other usable phosphates are those derived from amines such as, for instance, dimethylammonium phosphate or diethylammonium phosphate, ethylenediamine phosphate, melamine ortho or pyrophosphate.

As examples of nitrogen containing organic compounds (a) there may be cited: urea, N.N'-dimethylurea, thiourea, isocyanuric acid, ethyleneurea, ethylenethiourea, hexahydropyrimidin-2-one, hydantoin, parabanic acid, barbituric acid, uric acid, melamine, guanamine, methyl- and phenylguanamine (commonly called respectively aceto- and benzoguanamine), ammeline.

Amongst the epoxyalkyl esters of the isocyanuric acid the preferred one, for its greatest availability, is triglycidylisocyanurate.

In the following will now be given a number of examples of preparation of resins from triglycidylisocyanurate and various nitrogen containing compounds.

(a) Preparation of a resin triglycidylisocyanurate/ethyleneurea

Into a mixer of 350 cc of useful holding capacity and heated electrically, there were introduced 44.6 g (0.15 mols) of triglycidylisocyanurate and 12.9 g (0.15 mols) of anhydrous ethyleneurea. The reactants were slowly heated up to 130° C., a temperature at which both are in the molten state. The viscosity of the reaction mixture increased progressively until the whole mass solidified. After 4 hours the heating was stopped and the resin was discharged in the form of a fine white powder.

(b) Preparation of a resin triglycidylisocyanurate/N.N'-dimethylurea

Into the same mixer as that of example (a) there were introduced 44.6 g (0.15 mols) of triglycidylisocyanurate and 13.2 g (0.15 mols) of N.N'-dimethylurea. The mixture was then slowly heated up to 120° C., a temperature at which both reactants are in the molten state. The viscosity increased progressively until the reaction mixture solidified. After 3 hours the heating was stopped and a light yellow coloured granular resin was discharged.

(c) Preparation of a resin triglycidylisocyanurate/thiourea

Into the same mixer as that indicated in Example (a) there were introduced 44.6 g (0.15 mols) of triglycidylisocyanurate and 11.4 g (0.15 mols) of thiourea. The reactants were then heated up to 100° C., a temperature at which the reaction mixture appears as a molten opaque mass whose viscosity increases progressively. After about 2 hours the reaction mass solidified and showed up in the form of a fine light yellow coloured powder.

(d) Preparation of a resin triglycidylisocyanurate/urea

Into the same mixer as that of example (a) there were introduced 44.6 g (0.15 mols) of triglycidylisocyanurate and 9.0 g (0.15 mols) of urea. This mixture was thereupon heated up to 100° C., a temperature at which the reaction mixture appears in the form of a molten opaque mass whose viscosity increased progressively. After about 4 hours the mass had completely solidified and appeared in the form of a fine white powder.

(e) Preparation of a resin triglycidylisocyanurate/hydantoin

Into the same mixer as that of example (a) there were introduced 44.6 g (0.15 mols) of triglycidylisocyanurate and 15.0 g (0.15 mols) of hydantoin. The reactants were then slowly heated up to 130° C., a temperature at which the reaction mixture appears in the form a homogeneous molten hazel-coloured mass. The viscosity increased progressively until, after about 4 hours, the mass blocked the stirring. The still sticky product was then cooled down and discharged in the form of yellow granules which completely dissolve in boiling water.

The solubility of the resin may be reduced by carrying out the reaction in the presence of a small quantity of a catalyst, for instance a Lewis acid. In fact, by adding to the reaction mixture 1.5 g of $ZnCl_2$ while operating as described above, there is obtained a much less soluble product.

(f) Preparation of a resin triglycidylisocyanurate/melamine

Into the same mixer as that of example (a) were introduced 44.6 g (0.15 mols) of triglycidylisocyanurate and 9.4 g (0.075 mols) of melamine. Thereupon it was slowly heated up to 130° C., a temperature at which the reaction mixture appeared in the form of a white molten mass which gradually hardened.

After 2 hours of heating, the mass solidified and showed up in the form of a fine white powder.

(g) Preparation of a resin triglycidylisocyanurate/isocyanuric acid

Into the same mixer as that of example (a) where introduced 44.6 g (0.15 mols) of triglycidylisocyanurate and 19.3 g (0.15 mols) of isocyanuric acid.

Thereupon the reactants were slowly heated up to 130° C., a temperature at which the reaction mass appeared as a very viscous, white molten mass which gradually hardened. After 2 hours of heating the mass solidified and was then discharged in the form of a fine white powder.

(h) Preparation of a resin triglycidylisocyanurate/ethyleneurea/isocyanuric acid.

Into the same mixer as that of example (a) were introduced 40.0 g (0.135 mols) of triglycidylisocyanurate, 8.7 g (0.101 mols) of anhydrous ethyleneurea and 8.7 g (0.067 mols) of isocyanuric acid. The reactants were thereupon slowly heated up to 130° C., a temperature at which the reaction mixture showed up in the form of an opaque molten mass whose viscosity increases progressively.

After 2 hours of heating the mass had completely solidified and was discharged as a fine white powder.

(i) Preparation of a resin triglycidylisocyanurate/ethyleneurea/melamine

Into the same mixer as that of example (a) were introduced 39.6 g (0.133 mols) of triglycidylisocyanurate, 8.6 g (0.100 mols) of anhydrous ethyleneurea and 4.2 g (0.033 mols) of melamine. It was slowly heated up to 120° C., a temperature at which the mixture is in the form of an opaque molten mass whose viscosity increases progressively.

After 2 hours of heating the mass solidified and was discharged as a fine white powder.

With the same procedure was prepared a triglycidylisocyanurate/ethyleneurea/acetoguanamine resin, using the three reactants according to a molar ratio 1:0.5:0.5.

(1) Preparation of a resin triglycidylisocyanurate/urea/melamine

Into the same mixer as that of example (a) were introduced 44.6 g (0.15 mols) of triglycidylisocyanurate and 4.5 g (0.075 mols) of urea. It was slowly heated up to 100° C., a temperature at which the reaction mixture appeared in the form of an opaque molten mass. After 1 hour heating the still fluid mass was added with 9.4 g (0.075 mols) of melamine.

The viscosity of the molten mass increased gradually and after about 3 hours there was achieved complete solidification. The product was discharged in the form of a white powder.

In the preparation of examples reported above, the reactants were used according to a certain molar ratio: of course, the reactants may also be used according to any other molar ratio nitrogen containing compound/triglycidylisocyanurate comprised between 3:1 and 0.1:1, and there will still be obtained nitrogen containing resins endowed with excellent properties as components of anti-flame additives for polymers. In the case in which two or more nitrogen containing compounds are used, these may be introduced into the mixer containing the triglycidylisocyanurate either contemporaneously or according to an order different than that followed in the examples.

The above described anti-flame additives may be added to any type of thermoplastic polymer, in particular to polyolefines, and they may also be used in the production of intumescent paints or coatings containing as binder one of the polymers normally used in this field.

The self-extinguishing compositions of this invention may be obtained according to known methods: for instance by mixing the polymer and the anti-flame additives in a Banbury type blade mixer, at the plastification temperature of the polymer. The mix thus obtained is then extruded in a Dolci type extruder (screw diameter=20 mm; ratio length/diameter of the screw=23; rotary speed of screw=20 rpm) at the temperature most suited for obtaining a granular product, this temperature varying from polymer to polymer.

For evaluating the self-extinguishing properties of the polymeric compositions object of this invention, in general one proceeds in the following way: with the granular product are pressure molded a number of 3 mm thick small plates in a small Carver type press, by operating for 7 minutes at a pressure of 40 kg/sq.cm and at a suitable temperature that will vary from polymer to polymer.

On the small plates thus prepared, the level of self-extinction is determined by applying the UL-94 Rules (issued by the "Underwriters Laboratories"-USA) which supply an evaluation of the degree of self-extinction of the plastic materials. The UL-94 Rules foresee various different, more or less severe test conditions, and allow to classify the test piece at different self-extinction levels.

In the tests reported in Tables I and II there has been adopted the "Vertical Burning Test" which allows to classify the material at the decreasing levels: V-0, V-1 and V-2.

Each test is carried out on a group of 5 test pieces which may have a thickness of ¼, ⅛ or 1/16 of an inch.

The test piece, maintained in a vertical position by means of a suitable support, is primed with a flame at its lower end, and there are carried out two ignition attempts, each lasting 10 seconds. The three levels of self-extinction mentioned above, may be thus briefly summarized:

V-0 No test piece burns for more than 10 seconds after each application of the flame, nor does it drop lighted particles. Moreover, the total combustion time does not exceed 50 seconds for the 10 tests carried out on the group of 5 test-pieces.

V-1 There are allowed combustion times of up to 30 seconds for a single test-piece and up to 250 seconds for the 10 attempts carried out on the group of 5 test-pieces. Also at this level none of the test-pieces drops lighted particles.

V-2 The allowed combustion times are the same as those of level V-1, but there is allowed the dropping of lighted particles.

The examples reported in Tables I and II will serve to illustrate the present invention without, however, limiting its actual scope.

TABLE I reports the results achieved by adding to a polypropylene having a melt index of 1.5 g/10 min., ammonium polyphosphate or melamine pyrophosphate (molar ratio $H_4P_2O_7$:melamine equal to 1:2) and a nitrogen containing resin according to the invention; the molar ratio between the reactants, from which the resin has been obtained, are indicated between brackets. The anti-oxidant used is a mixture of 6 parts of dilaurylthio dipropionate and 4 parts of tetra[3-(3.5-di-t-butyl-4-hydroxyphenyl)-propionate] of pentaerythritol.

The above is also valid for TABLE II which refers to compositions based on a high density polyethylene or on an impact resistant polystyrene containing 5% of polybutadiene.

TABLE I

Polypropylene-based self-extinguishing compositions.

| COMPONENTS: | Parts by weight | | | | | | |
|---|---|---|---|---|---|---|---|
| | Ex. 1 | Ex. 2 | Ex. 3 | Ex. 4 | Ex. 5 | Ex. 6 | Ex. 7 |
| Polypropylene | 74 | 74 | 74 | 74 | 74 | 74 | 74 |
| Antioxidant | 1 | 1 | 1 | 1 | 1 | 1 | 1 |
| Ammonium polyphosphate ("Exolit 263") | 18 | 18 | 18 | 18 | 18 | 18 | 18 |
| Triglycidyl isocyanurate/urea (1.0:1.2) | 7 | — | — | — | — | — | — |
| Triglycidyl isocyanurate/hydantoin (1.0:1.0) | — | 7 | — | — | — | — | — |
| Triglycidyl isocyanurate/thiourea (1.0:1.0) | — | — | 7 | — | — | — | — |
| Triglycidyl isocyanurate/ethyleneurea/melamine (1.0:0.75:0.25) | — | — | — | 7 | — | — | — |
| Triglycidyl isocyanurate/ethyleneurea (1.0:1.0) | — | — | — | — | 7 | — | — |
| Trigylcidyl isocyanurate/N.N'-dimethylurea (1.0:1.0) | — | — | — | — | — | 7 | — |
| Triglycidyl isocyanurate/urea (1.0:1.0) | — | — | — | — | — | — | 7 |
| UL-94 (⅛ inch) | V-O | V-O | V-O | V-O | V-O | V-O | V-O |

| COMPONENTS: | Parts by weight | | | | | | |
|---|---|---|---|---|---|---|---|
| | Ex. 8 | Ex. 9 | Ex. 10 | Ex. 11 | Ex. 12 | Ex. 13 | Ex. 14 |
| Polypropylene | 74 | 74 | 74 | 74 | 74 | 74 | 74 |
| Antioxidant | 1 | 1 | 1 | 1 | 1 | 1 | 1 |
| Ammonium polyphosphate ("Exolit 263") | 18 | 18 | 18 | 18 | 18 | 18 | — |
| Melamine phosphate | — | — | — | — | — | — | 18 |
| Trigylcidyl isocyanurate/ethyleneurea/melamine (1.0:0.25:0.75) | 7 | — | — | — | — | — | — |
| Triglycidyl isocyanurate/ethyleneurea/isocyanuric acid (1.0:0.75:0.5) | — | 7 | — | — | — | — | — |
| Triglycidyl isocyanurate/isocyanuric acid (1.0:1.0) | — | — | 7 | — | — | — | — |
| Triglycidyl isocyanurate/urea/melamine (1.0:0.5:0.5) | — | — | — | 7 | — | — | — |
| Trigylcidyl isocyanurate/ethyleneurea/acetoguanamine (1.0:0.5:0.5) | — | — | — | — | 7 | — | — |
| Triglycidyl isocyanurate/melamine (1.0:0.5) | — | — | — | — | — | 7 | 7 |
| UL-94 (⅛ inch) | V-O | V-O | V-O | V-O | V-O | V-O | V-O |

TABLE II

Self-extinguishing compositions based on high density polyethylene or on impact resistant polystyrene.

| COMPONENTS: | Parts by weight | |
|---|---|---|
| | Example 15 | Example 16 |
| High density polyethylene | 64 | — |
| Polystyrene at 5% of polybutadiene rubber | — | 64 |
| Antioxidant | 1 | 1 |
| Ammonium polyphosphate ("Phos-Chek P/30") | 25 | 25 |
| Triglycidyl isocyanurate/isocyanuric acid (1.0:1.0) | 10 | — |
| Triglycidyl isocyanurate/melamine (1.0:0.5) | — | 10 |
| UL-94 (⅛ inch) | V-O | V-O |

What is claimed is:

1. Self extinguishing polymeric compositions, comprising a thermoplastic polymer and an anti-flame additive consisting of:
   (1) 10–25% by weight, on the total composition, of an ammonium polyphosphate or amine phosphate; and
   (2) 10–25% by weight, on the total composition, of a product obtained by reacting in bulk, at a temperature comprised between 80° C. and 230° C.,
      (a) at least one organic compound selected from the group consisting of
         (i) urea, N,N'-dimethylurea, thiourea, ethyleneurea, hydantoin, isocyanuric acid, mixtures of ethyleneurea and melamine, mixtures of ethyleneurea and isocyanuric acid, mixtures of urea and melamine, mixtures of ethylene urea and acetoguanamine; with
      (b) an epoxyalkyl ester of isocyanuric acid of the formula:

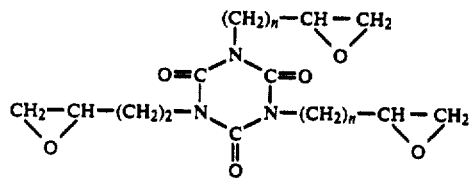

wherein n is an integer from 1 to 3;
the reaction being carried out according to a molar ratio (a):(b) comprised between 3:1 and 0.1:1.

2. Compositions according to claim 1, in which as component (2) of the anti-flame additive there is used a product obtained by the reaction of triglycidyl isocyanurate with urea.

3. Compositions according to claim 1, in which as component (2) of the anti-flame additive there is used a product obtained by reacting triglycidyl isocyanurate with N,N'-dimethyl-urea.

4. Compositions according to claim 1, in which as component (2) of the anti-flame additive there is used a product obtained by reacting triglycidyl isocyanurate with thiourea.

5. Compositions according to claim 1, in which as component (2) of the anti-flame additive there is used a product obtained by the reaction of triglycidyl isocyanurate with ethyleneurea.

6. Compositions according to claim 1, in which as component (2) of the anti-flame additive there is used a product obtained by reacting triglycidyl isocyanurate with hydantoin.

7. Compositions according to claim 1, in which as component (2) of the anti-flame additive there is used a product obtained by the reaction of triglycidyl isocyanurate with isocyanuric acid.

8. Compositions according to claim 1, in which as component (2) of the anti-flame additive there is used a product obtained by reacting triglycidyl isocyanurate with ethyleneurea and with melamine.

9. Compositions according to claim 1, in which as component (2) of the anti-flame additive there is used a product obtained by reacting triglycidyl isocyanurate with ethyleneurea and with isocyanuric acid.

10. Compositions according to claim 1, in which as component (2) of the anti-flame additive there is used a product obtained by the reaction of triglycidyl isocyanurate with urea and with melamine.

11. Compositions according to claim 1, in which as component (2) of the anti-flame additive there is used a product obtained by the reaction of triglycidyl isocyanurate with ethyleneurea and with acetoguanamine.

12. Compositions according to claim 1, in which the thermoplastic polymer is a polyolefin.

13. Compositions according to claim 1, in which the thermoplastic polymer is polypropylene.

14. Compositions according to claim 1, in which the thermoplastic polymer is polyethylene.

15. Compositions according to claim 1, in which the thermoplastic polymer is polystyrene.

* * * * *

UNITED STATES PATENT AND TRADEMARK OFFICE
CERTIFICATE OF CORRECTION

PATENT NO. : 4,333,869
DATED : June 8, 1982
INVENTOR(S) : Marciandi, et al.

It is certified that error appears in the above—identified patent and that said Letters Patent is hereby corrected as shown below:

Column 3, line 25, change "$NH_2PO_3)n$" to --$NH_4PO_3)n$--.

Column 4, line 62, change "where" to --were--.

Signed and Sealed this

Nineteenth Day of October 1982

[SEAL]

Attest:

Attesting Officer

GERALD J. MOSSINGHOFF
Commissioner of Patents and Trademarks